United States Patent [19]
Sheldon et al.

[11] Patent Number: 5,884,563
[45] Date of Patent: Mar. 23, 1999

[54] RIDE ATTRACTION SYSTEM FOR THE PHYSICALLY DISABLED

[75] Inventors: Benjamin Sheldon, Universal City, Calif.; Leo Kohler; Rene Ploum, both of Heerlen, Netherlands; David Danon, Universal City, Calif.; Neil Engel, Universal City, Calif.; Gene Leasure, Universal City, Calif.; Tim Sepielli, Universal City, Calif.; Michael Taylor, Universal City, Calif.; William Whitcomb, Universal City, Calif.; Chris Peters; Ben Van Elk, both of Viodrop, Netherlands; John Leisner, Universal City, Calif.

[73] Assignee: Universal City Studios, Inc., Universal City, Calif.

[21] Appl. No.: 663,027

[22] Filed: Jun. 7, 1996

(Under 37 CFR 1.47)

[51] Int. Cl.[6] ........................................................ B60P 1/00
[52] U.S. Cl. ............................ 104/53; 414/543; 414/921
[58] Field of Search ........................ 104/53, 59; 414/921, 414/540, 543

[56] References Cited

U.S. PATENT DOCUMENTS

| | | |
|---|---|---|
| 4,170,368 | 10/1979 | Southward et al. . |
| 4,221,008 | 9/1980 | Nolan . |
| 4,306,634 | 12/1981 | Sangster . |
| 4,352,218 | 10/1982 | Lundberg . |
| 4,399,570 | 8/1983 | Tracy et al. . |
| 4,581,778 | 4/1986 | Pontoppidan . |
| 4,733,418 | 3/1988 | Luther . |
| 4,901,968 | 2/1990 | Ellis et al. . |
| 4,928,330 | 5/1990 | Moore . |
| 5,209,178 | 5/1993 | Rowe . |
| 5,279,004 | 1/1994 | Walker . |
| 5,365,618 | 11/1994 | Gilbert . |
| 5,431,526 | 7/1995 | Peterson et al. . |
| 5,456,335 | 10/1995 | Kinsey . |
| 5,549,072 | 8/1996 | Maloney . |
| 5,564,984 | 10/1996 | Mirabella et al. . |
| 5,613,825 | 3/1997 | Dorn . |
| 5,709,154 | 1/1998 | Schott . |

*Primary Examiner*—Mark T. Le
*Attorney, Agent, or Firm*—Lyon & Lyon LLP

[57] ABSTRACT

A ride attraction includes a vehicle having a seat mover for use by physically disabled passengers. A swing arm is pivotally attached to a jack post in the boat, with an extension arm attached to the swing arm. The physically disabled passenger is moved to a loading position on a seat supported by a dolly. The extension arm of the seat mover engages the seat. The seat is locked onto the extension arm and unlocked from the dolly. The jack post lifts the seat high enough to clear the side of the vehicle. The seat is swung into position in the vehicle and lowered on the jack post, and then locked into position in the vehicle. Accordingly, the physically disabled are provided access to theme park ride attractions.

22 Claims, 9 Drawing Sheets

RIDE ATTRACTION SYSTEM FOR THE PHYSICALLY DISABLED

BACKGROUND OF THE INVENTION

The field of the invention is theme or amusement park ride attractions.

Theme or amusement parks have become increasingly popular. More sophisticated and creative ride attractions have been principle factors in the popularity and success of such parks. Theme park ride attractions typically involve vehicles, such as roller coaster type cars, rail cars, automobile type cars, etc. moving along a closed or continuous loop path, either on their own wheels, or on a sub-carriage or other support. Water ride attractions similarly have water vehicles, for example, boats, submarines, or flume vehicles, moving through a water filled channel or flume path. In general, the vehicles in these types of ride attractions have seats for several passengers. The passengers step into the vehicles and seat themselves. At the end of the ride, the passengers similarly step or climb out of the vehicle.

Because access to the ride vehicles requires that the passengers be able to walk, step up, down, or to one side, with at least a nominal level of agility, the physically handicapped have been largely prevented from enjoying these types of theme park ride attractions. Wheelchair users and others having limited mobility, while increasingly gaining access to public and private buildings, transportation systems and other facilities, remain virtually excluded from most if not all of the premier attractions at amusement and theme parks. Accordingly, improvements in theme park ride attractions are necessary to better accommodate the physically disabled.

SUMMARY OF THE INVENTION

To these ends, a ride attraction includes a vehicle movable on or in a vehicle path. The vehicle may be a land or water vehicle, or even a vehicle on or in a round ride which moves through the air above ground. A seat mover in the vehicle moves a designated seat between a position in the vehicle and a position on the ground or on a platform. Preferably, the seat is separable from the seat mover. A dolly is advantageously provided to maneuver a passenger sitting in the seat to a loading position, wherein the seat is attached to the seat mover, and then moved into the vehicle. The seat mover, in a preferred embodiment, has a swing arm pivotably attached to a jack post, and to an extension arm, to allow the seat to lift and swing between loading and seated positions.

Thus, it is an object of the invention to provide an improved ride attraction having better access for the physically disabled. Other and further objects and advantages will appear hereinafter.

BRIEF DESCRIPTION OF THE DRAWINGS

In the drawings, wherein similar reference characters denote similar elements throughout the several views.

DETAILED DESCRIPTION OF THE DRAWINGS

Figure 1:
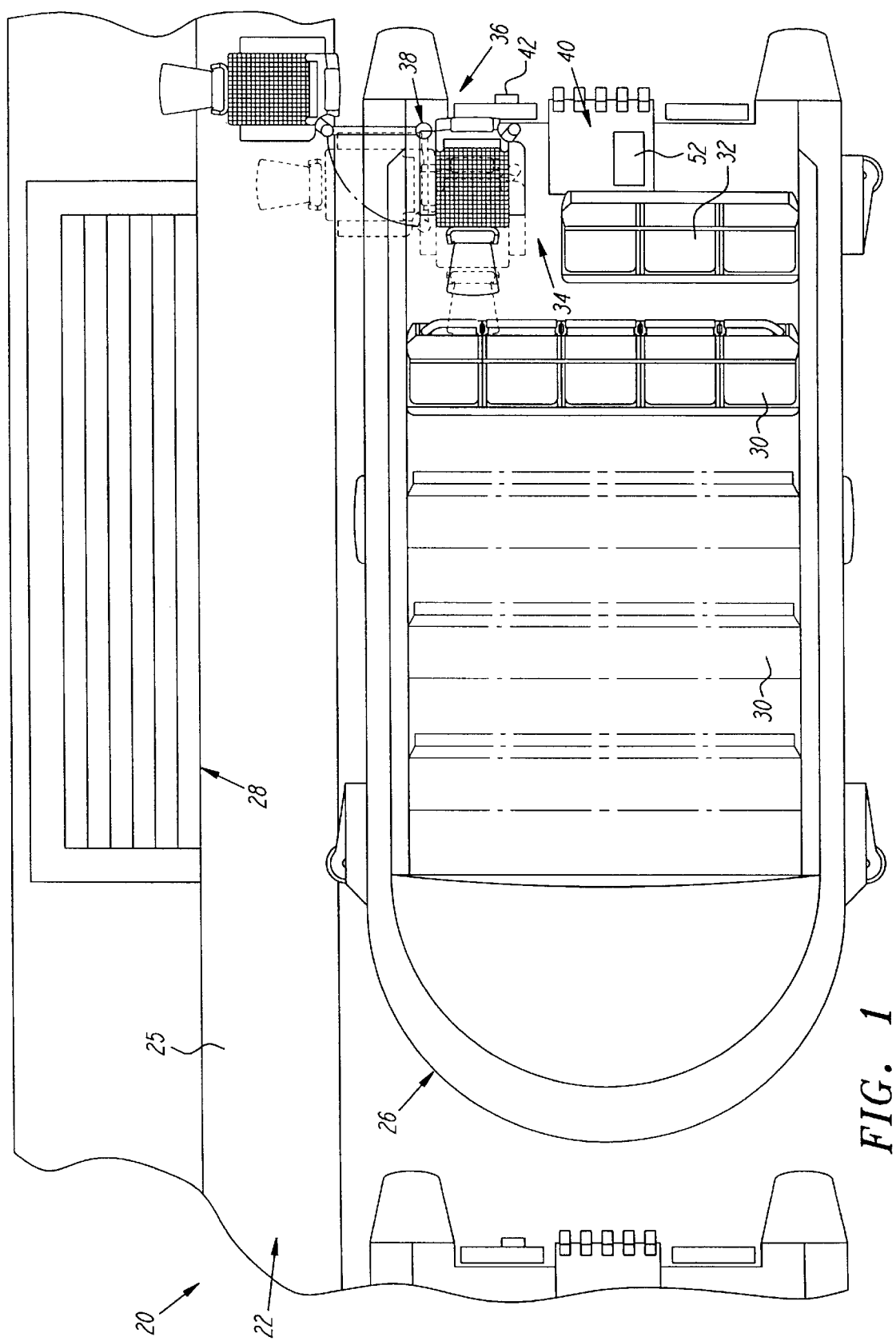
FIG. 1 is a plan view of the present ride attraction.

Turning now in detail to the drawings, as shown in FIG. 1, the present ride attraction 20, includes a path 22, specifically a flume channel 24 filled with water 25. A boat 26 has rows of fixed seats 30. The rear row of seats 32 is shortened to include three seats, instead of five seats as in the front four rows. The missing two seats in the rear row 32 provides a space 34 for a seat mover 38. A hydraulic system 40 on the boat 26 provides lifting force for the seat mover 38. Alternatively, power may be supplied by on-board batteries. The hydraulic system 40 includes electric motors driving hydraulic pumps. Electric power is provided to the motors via an overhead cable on a boom arm stationed on or over the platform 28, with the cable connecting to a power connector 42 on the boat 26, during operation of the seat mover 38. A hand pump 52 is linked to the hydraulic system 40, for operation of the seat mover 38 during a power failure or other emergency situation. Alternatively, an electric or pneumatic actuator may be used, with on board sources of electric or pneumatic power, or via platform based power lines or hoses. A platform based hydraulic line could also be used to drive an on-board passive actuator. Side rollers 54 guide the boat 26 in the flume channel 24.

Figure 2:
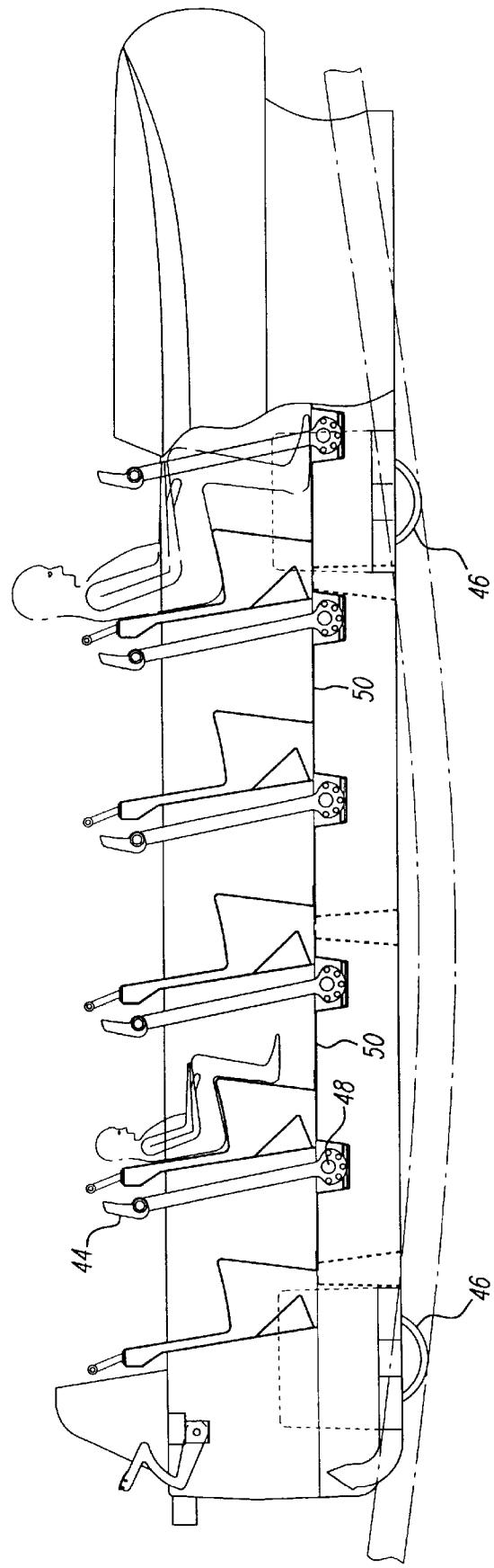
FIG. 2 is a side elevation view, in part section of the boat vehicle shown in FIG. 1.

As shown in FIG. 2, the boat 26 may be provided with wheels 46. Passenger restraint bars 44 are provided for each passenger in the fixed seats 30. The restraint bars pivot on axles 48 below the floor 50 of the boat 26, and are moved to secure the passengers in the fixed seats 30 during operation of the ride attraction, as is well known in the art.

Figures 4, 4A:
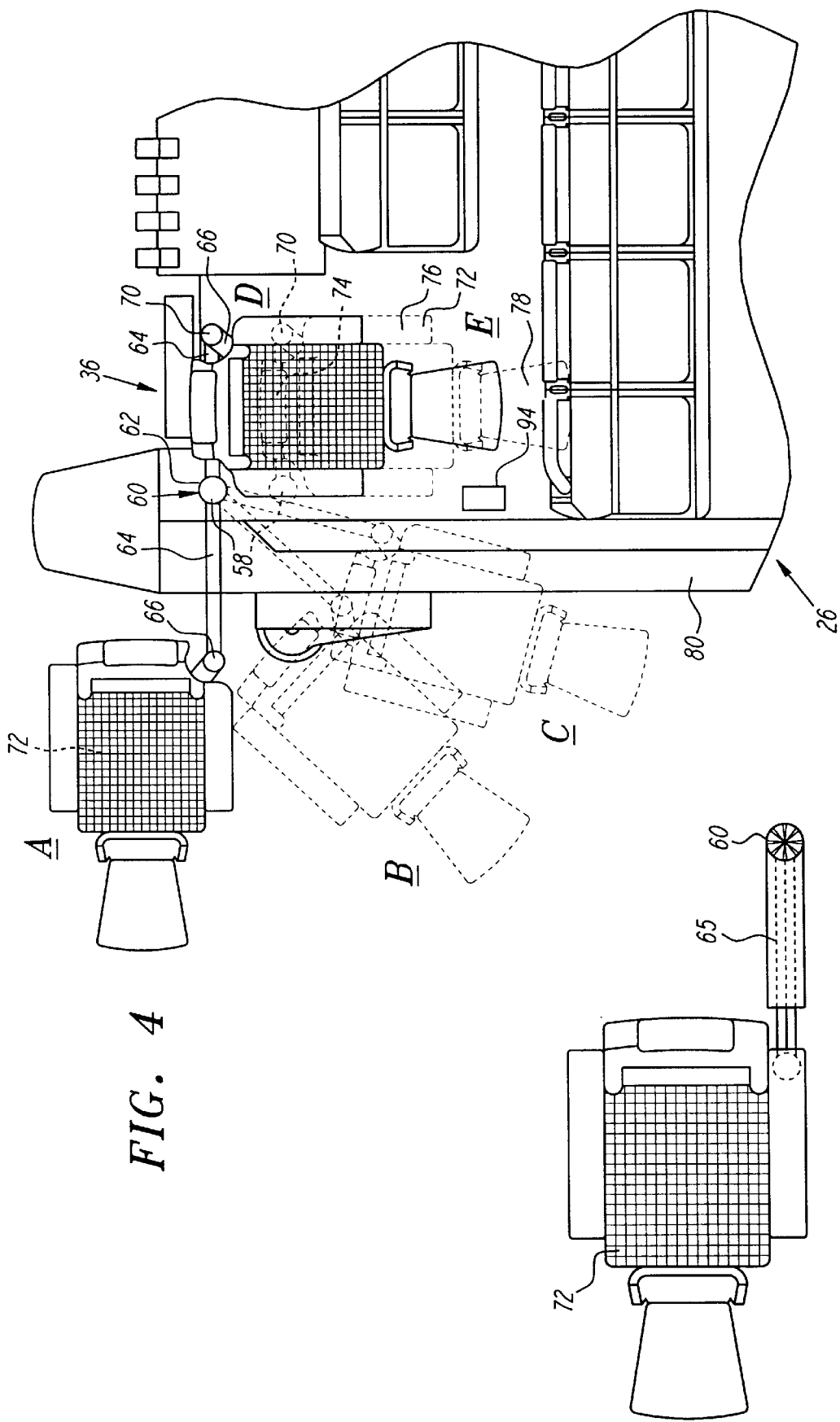
FIG. 4 is an enlarged plan view of the back inside corner of the boat of FIG. 1, showing the seat swing or pivot sequence.
FIG. 4A is a plan view of a seat mover having a telescoping arm.
Figure 5:
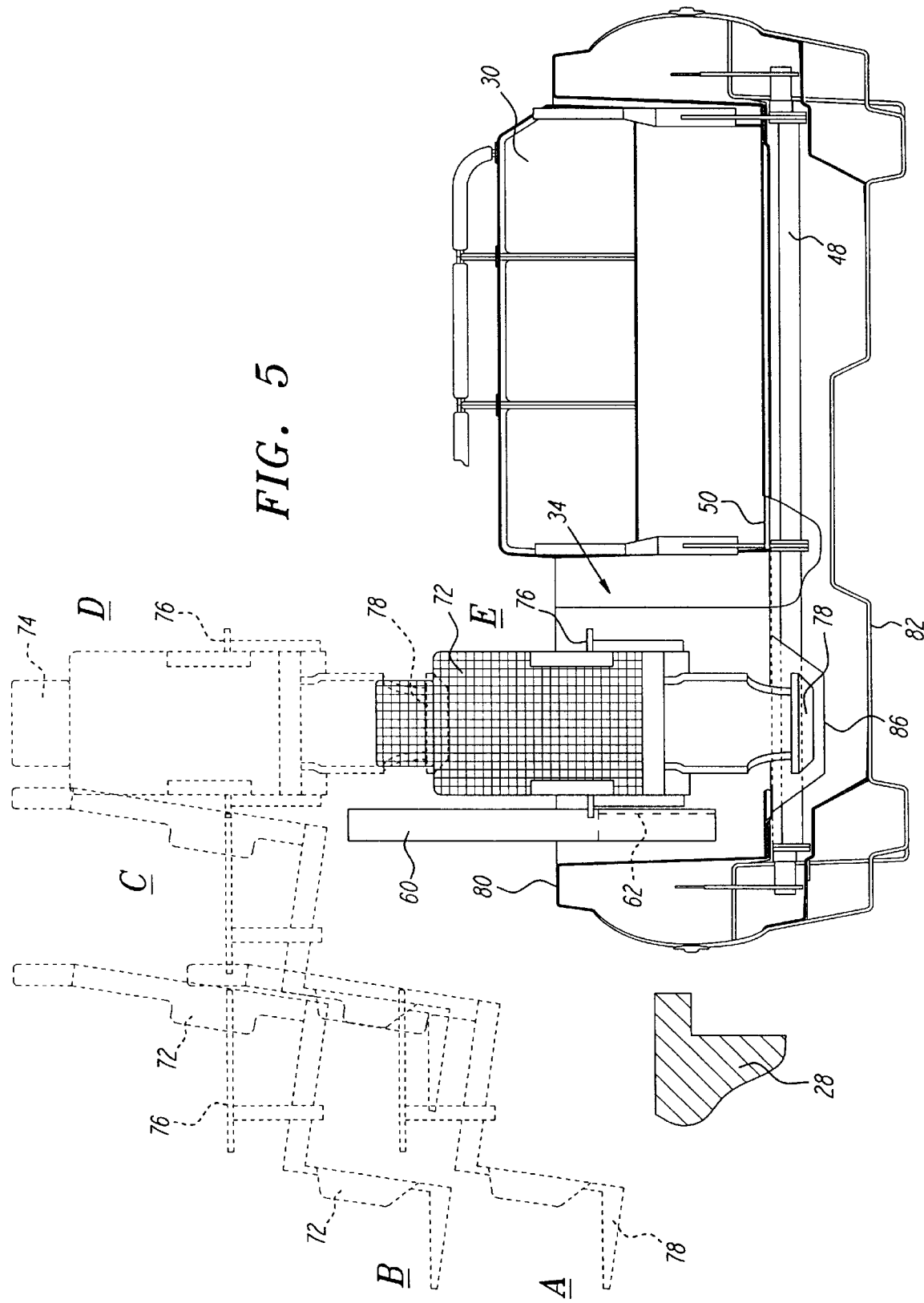
FIG. 5 is a front elevation view in part section of the boat of FIG. 1 showing alternate seat positions.
Figure 6:
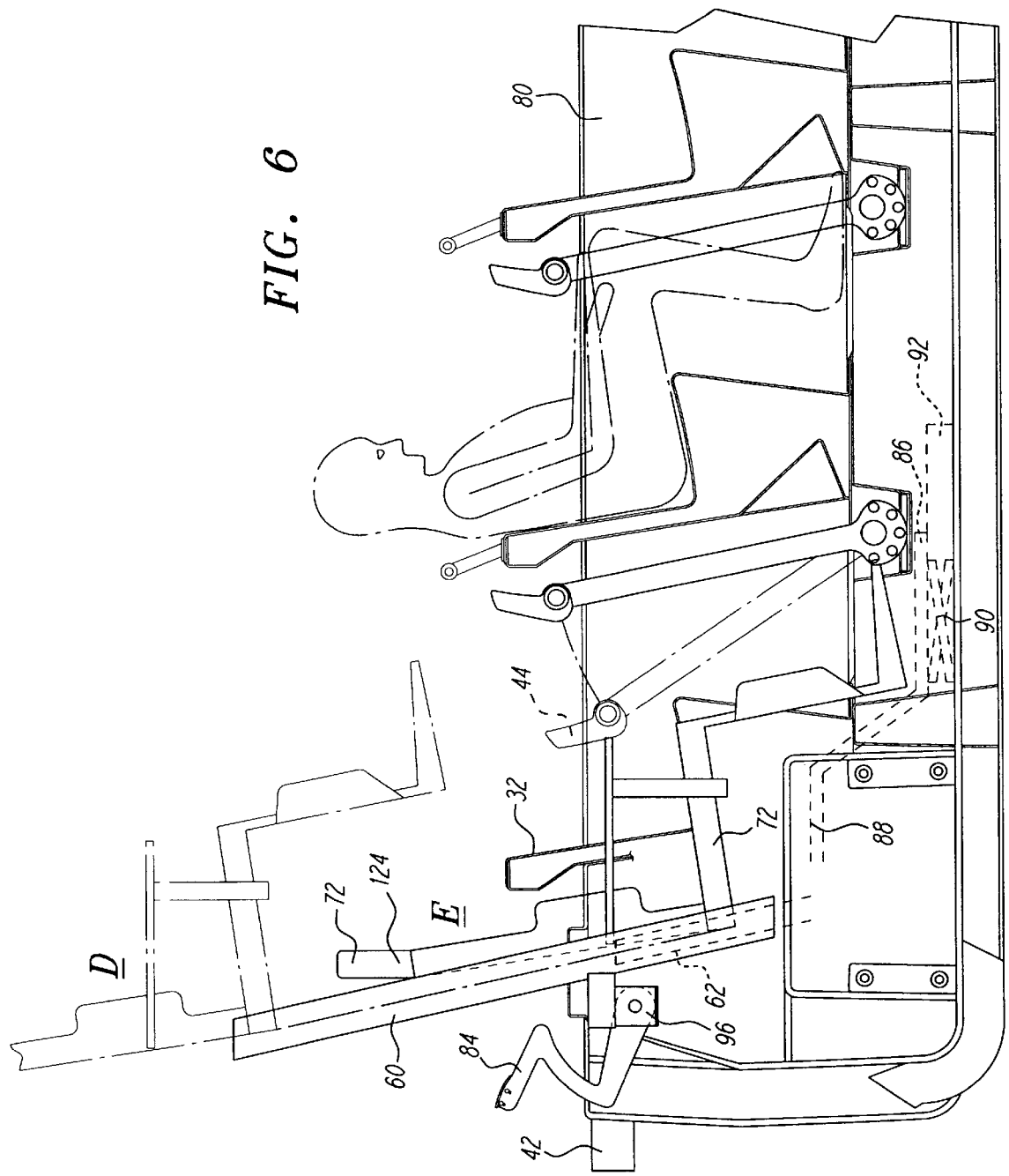
FIG. 6 is an enlarged side elevation view in part section of the rear inside corner of the boat of FIG. 1.

Referring to FIGS. 3, 4, 5 and 6, a jack post 60 includes a hydraulic actuator 62. A swing arm 64 is pivotably attached to the hydraulic actuator 62. An extension arm 66 is pivotably attached to the swing arm at an extension arm pivot joint 70. A movable seat 72 is secured to the extension arm 66. The seat 72 has a head rest 74, arm rest 76 and a foot rest 78. As shown in FIG. 6, the jack post, which is secured to the hull, slants rearwardly.

Referring specifically to FIG. 5, with the seat 72 positioned and secured within the boat 26, the arm rests 76 are below the level of the gunnel 80. A recessed sub-floor 86 is located in the space 34, at the rear outside corner 36 of the boat 26, in place of the floor 50, which otherwise has a uniform height within the hull 82. The sub-floor is joined to a sub-seat 88 ordinarily covered by the movable seat 72. The sub-seat ordinarily is at the same height as the rear bench fixed seats 32. The sub-seat 88 and sub-floor 86 are connected to a scissor linkage 90 and a gas spring 92 biasing the sub-floor 86 and sub-seat 88 into a raised position.

Figure 7:
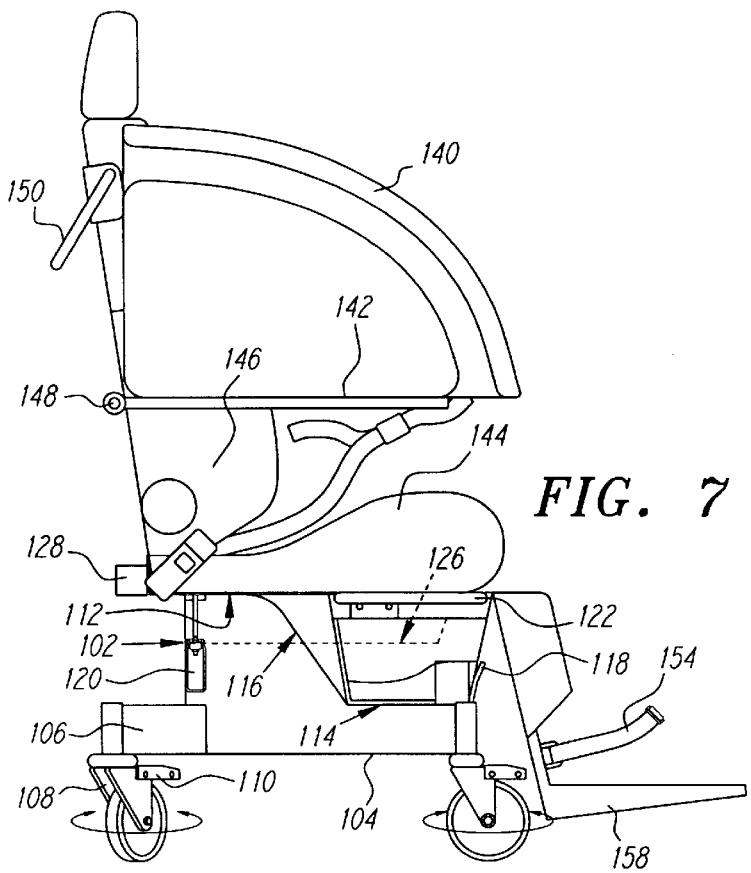
FIG. 7 is a right side elevation view of an alternative seat embodiment and seat dolly.
Figure 8:
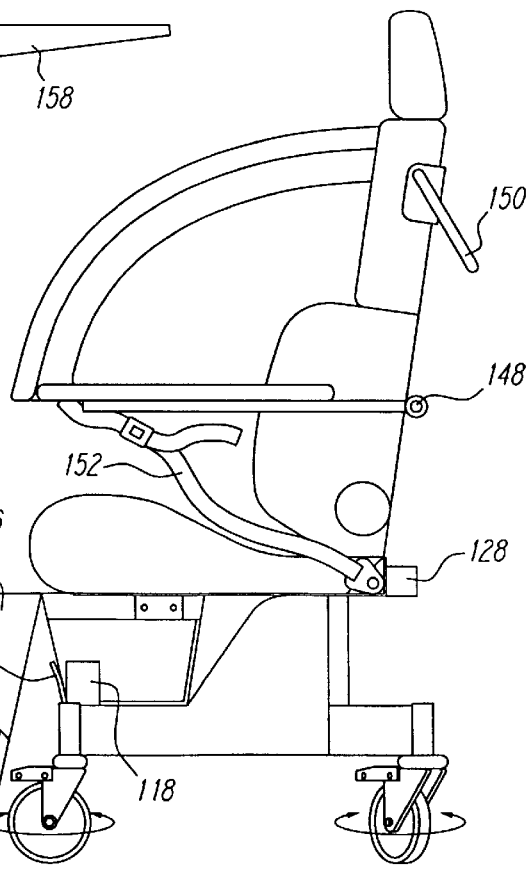
FIG. 8 is a left side elevation view thereof.

Referring now to FIGS. 7–10, a seat dolly 102 has a open top chassis 104. L-shaped legs 106 are attached to the corners of the chassis 104. A caster wheel 108 and brake 110 are provided at the outside end of each leg 106. As shown in FIGS. 7 and 8, the chassis 104 has a plateau 112 positioned above a base 114, with an inclined surface 116 extending between the plateau 112 and base 114. Angled guide tabs 118 extend upwardly and outwardly from the front left and right corners of the base 114. Side handles 122 on the dolly 102 facilitate lifting.

Figure 3:
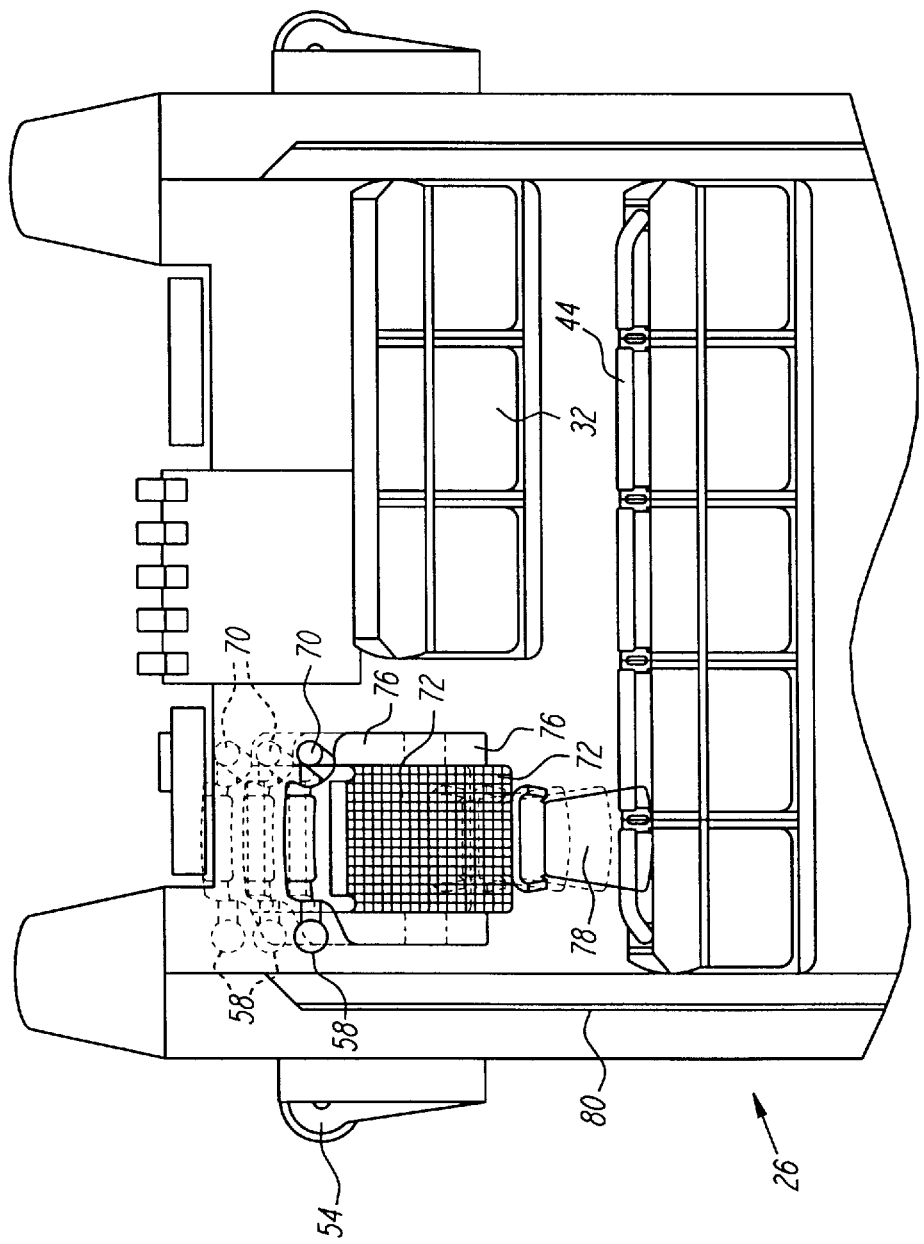
FIG. 3 is an enlarged plan view of the back end of the boat shown in FIG. 1, and illustrating the lifting sequence of the seat mover shown in FIG. 1.
Figure 10:
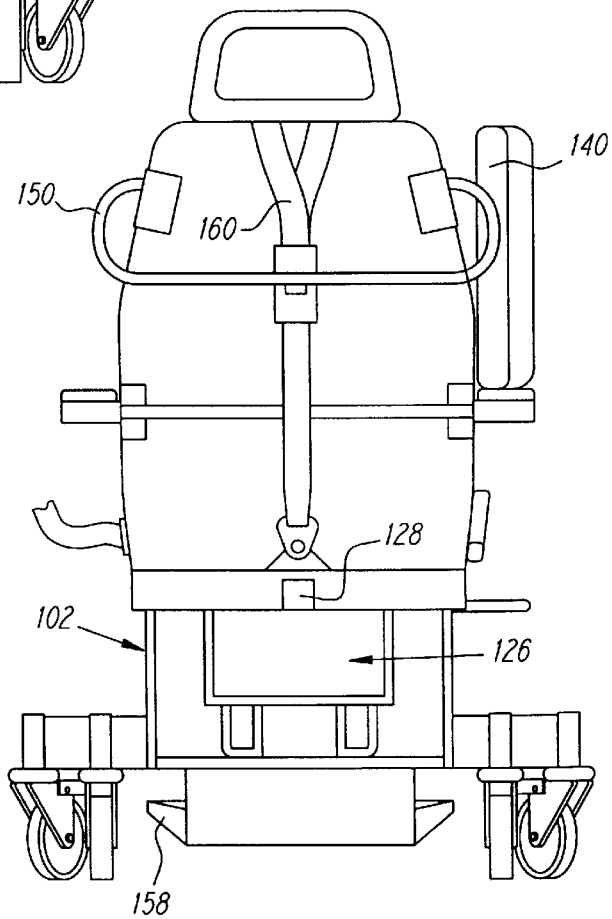
FIG. 10 is a rear elevation view thereof.

A seat 124 is somewhat similar to seat 72 shown in FIGS. 3–5, but includes a rectangular opening or seat slot 126 on the back surface, as best shown in FIG. 10. A locking tab 128 is attached to the seat 124 above the seat slot 126. Hand latches 120 lock the seat 124 onto the dolly 102.

Referring to FIGS. 7 and 8, a sector-shaped gunnel shield 140 is pivotably attached to the seat 124 by a shield pivot pin 148. The gunnel shield 140 includes a right side arm rest 142. The seat 124 has a seat pad 144 and seat back cushion 146.

Figure 9:
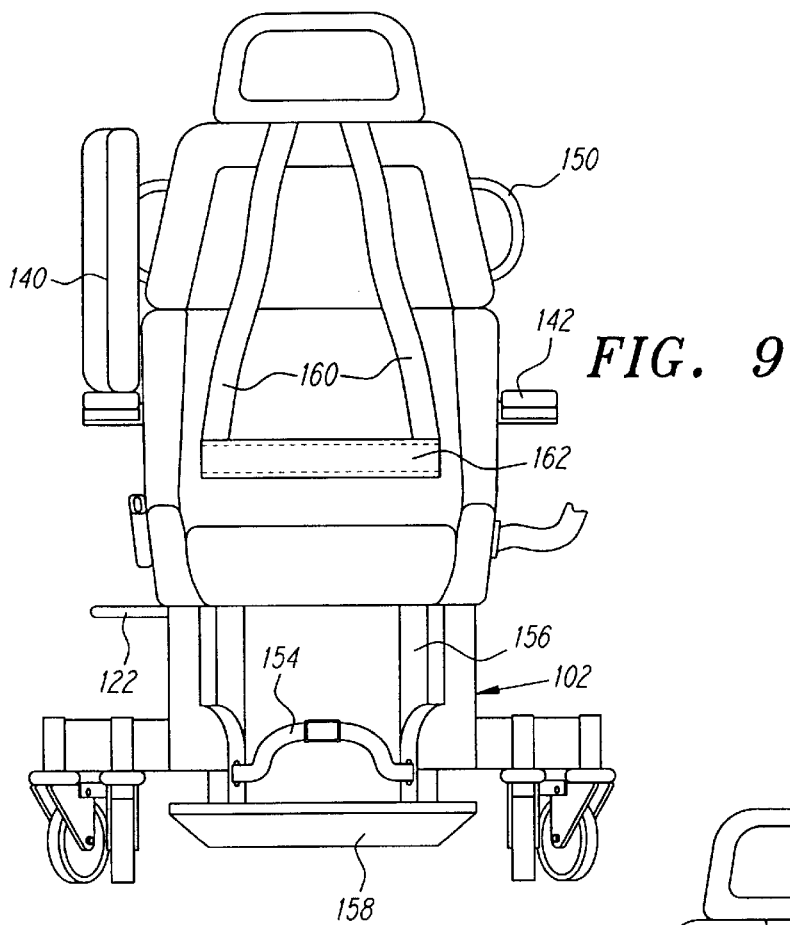
FIG. 9 is a front elevation view thereof.

As shown in FIGS. 7, 8 and 10, a seat back handle 150 is attached to the back of the seat 124 and extends out to the sides. Referring to FIGS. 8 and 9, a lap seat belt 152 is attached to the seat 124. Shoulder belts 160 extend up the back of the seat 124 and are secured to a lap belt slider 162, which slides over the lap belt 152. (The lap belt 152 passes inside of the slider 162). Leg rests 156 and a foot rest 158 extend below the seat pad 144. A leg belt 154 may be used to secure the passengers feet in position.

Figure 11:
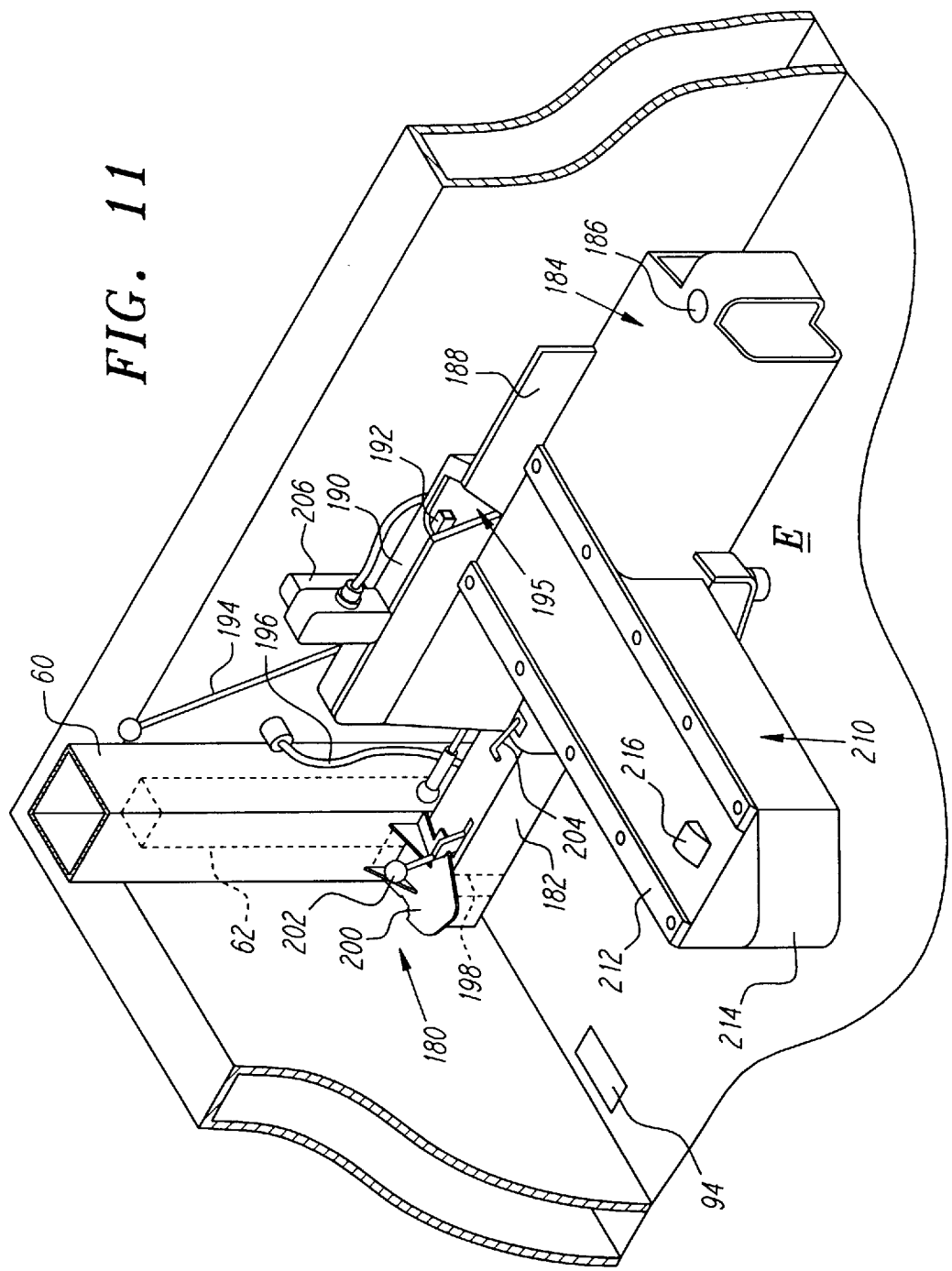
FIG. 11 is a partial perspective view of an alternative preferred embodiment seat mover.

As shown in FIG. 11, in an alternative preferred embodiment, the seat mover 180 includes a swing arm 182, and an extension housing 184 (rather than an extension arm 66 as shown in FIG. 4). The swing arm 182 is pivotably attached to a jacking plate 200 on the jack post 60. A swing lock lever 202 on the swing arm 182 locks the swing arm 182 into the ride position E shown in FIG. 11, or into a load/unload position A (as shown in FIG. 4), via the lever 202 engaging slots in the jacking plate 200.

The extension housing 184 is pivotably attached to the swing arm 182 by a pivot joint or pin 186. The extension housing 184 is similarly lockable into the ride position E shown in FIG. 11, or the load/unload position A, shown in FIG. 4 by an extension housing pivot lock 204. A back plate 188 extends upwardly from the extension housing 184. A back plate channel 190 is attached to the back plate 188, with a lock tab opening 195 extending into the channel 190. A lock tab retainer 192 moves into and out of the opening 195, with movement of the retainer hand lever 194.

The extension housing 184 has a perpendicularly mounted T-leg 210 extending forwardly. Non-metal slide strips 212 are attached to the top surface of the T-leg 210, on either side of a secondary seat lock 216. The front end of the T-leg 210 has angled sides 214. A control box 206 is linked to the hydraulic actuator 62 by a cable 196.

In use, the ride attraction 20 allows the physically disabled to enter, safely ride, and exit the boat 26. Referring to FIGS. 7–10, the seat 124 is securely attached to the dolly 102 by the latches 120. The physically disabled passenger is seated in the seat 124. This may occur on the load/unload platform 28, or at a private location. The lap belts 152 and shoulder belts 160 (and optionally the leg belt 154) are adjusted and fastened. The gunnel shield 140 may be pivoted up and out of the way when the disabled passenger moves onto to the seat 124 and then lowered into position. The gunnel shield provides a barrier between the seat 124, which will be moved up and down, and the seat mover, locks, and any potential pinch or shear points along the inside edge of the boat.

With the passenger safely belted into the seat 124, the passenger and seat 72 are moved on the dolly 102 to the platform 28, which is the same platform used by the other passengers to load and unload. The dolly 102 is maneuvered so that the seat slot 126 slides over the T-leg 210. Once properly positioned, the secondary seat lock 216 pops up to prevent the seat 124 from moving off of the T-leg 210. The ride operator moves the retainer lever 194 (to the right in FIG. 11) causing the retainer to engage the lock tab 128 on the back of the seat 124, further securing the seat 124 onto the T-leg 210 of the extension housing 184.

The latches 120 on the dolly are then released, allowing the seat 124 to be separated from the dolly 102. The hydraulic actuator 62 is energized via the control box 206 lifting the jacking plate 200, swing arm 182, extension housing 184 and the seat 124 holding the passenger. The dolly 102 remains on the platform. When the seat 124 has been lifted high enough by the actuator 62 so that the foot rest 154 is above the level of the gunnel 80 (preferably a predetermined height set via an automatic stop), the swing lock lever 202 and extension housing pivot lock 204 are released. The ride operator then pushes and swings the seat 124 from position A through positions B and C to position D, as shown in FIGS. 4 and 5. The swing lock lever 202 and pivot lock 204 are then re-engaged. The seat 124 is then secured in position D, and no further swinging movement can occur.

Using the control box 206, the operator energizes the hydraulic actuator 62 to lower the seat 124 from position D, to the ride position E, in FIG. 5. As this lowering occurs, the seat also moves forward, as shown in the series of alternate positions in FIG. 3, as determined by the slant angle θ of the jack post (preferably about 10°–20° from vertical). This combination of moves allows the seat to swing from position A to E without interfering with passenger or seats in front of the space 34. While a single swing arm 182 could be used (i.e., without an extension arm or extension housing), the single arm would have to be long enough to reach the platform. This length would cause it (and seat 124) to pass over the seats in front and interfere with the loading and unloading of the other passengers. A single swing arm of variable length, i.e., a telescoping single swing arm, as shown in FIG. 4A, overcomes this disadvantage, and may be used in place of the swing arm and extension arm or housing shown in FIG. 11. The telescoping arm is pivotably attached directly to the side or center of the seat.

As the hydraulic actuator 62 moves the seat 124 down, the bottom of the seat pushes the sub-floor 86 and sub-seat 88 down, against the force of the gas spring 92, to created the additional clearance required for the seat 124 and foot rest 158. When fully positioned downwardly into the boat, the seat lock 96 locks the seat 124 into the boat. The visual seat lock status indicator 94 changes color to indicate that the seat 124 is in the down and locked position, so that the boat 26 can begin the ride. The power cable suspended from the platform is disconnected from the connector 42 and moved out of the way. The boat then departs. (The central ride controller disables boat movement at the platform while the power cable is plugged into a boat.)

After the ride is over, the physically disabled passenger disembarks via reverse sequence of steps. The boat is braked to prevent movement. The power cable is plugged into the connector 42. The ride operator steps on the foot pedal release 84 (shown in FIG. 6) releasing the seat lock 96. Via a controller (not shown), the ride operator causes the hydraulic actuator 62 to lift the seat 124 from position E, to position D. The swing lock lever 202 and extension housing pivot lock 204 are disengaged and the seat is pulled through positions C and B, and back to position A, by the ride operator. The dolly 102 is maneuvered into position and the seat 82 lowered onto the dolly. The guide tabs 118 and incline 116 on the dolly 102 facilitate alignment of the seat 124 onto the dolly 102. The seat 124 is released from the T-leg 210 by reverse movement of the retainer lever 194, thereby unlocking the engagement between the T-leg 210 and the lock tab 128 on the seat, and the secondary seat lock 216 on the seat bottom. The seat 124 is secured to the dolly 102 via the latches 120 and is disengaged and moved away from the T-leg 210. With multiple seats and dollies, another disabled passenger may then be moved into position for loading.

As the seat 124 moves up, the sub-seat 88 and sub-floor 86 also move up automatically, driven by the gas pressure spring 92, to match the seat and floor levels of the fixed seats 30. Accordingly, passengers loading and unloading into the three seats on the rear bench 32 do not encounter uneven floor or seat surfaces, thereby making loading and unloading safer and easier.

The present ride attraction 20 may be enjoyed even by persons who are confined to a wheelchair. If such persons cannot move from their wheelchair to the seat 124, they may be assisted by their family members or ride operators, on the platform or elsewhere. The passengers in the other fixed seats 30, including on the rear three seats 32 load and unload in the usual way, by climbing into and out of the boat 26. The seat mover 38 does not interfere with their movement.

The load or unload sequence ordinarily takes less than one minute, thereby avoiding materially slowing the ride attraction 20.

If no disabled person is present, a standard (two position) seat may be quickly installed in the space 34 on top of the sub-seat 88 and sub-floor 86, thereby allowing the boat 26 to run at full capacity. When a standard seat is installed in the boat, an extension for the restraint bar 44 in the last row of seats is installed, to provide a restraint bar for all passengers.

The gas spring 92 exerts sufficient force via the scissor linkage 90 on the sub-floor 86 and sub-seat 88, to resist any downward movement merely under the weight of passengers. The sub-floor 86 and sub-seat 88 move down to their low positions, to provide clearance for the seat 124, only when forced down via the descending hydraulic actuator, which exerts sufficient force to compress the gas spring.

The separable dolly 102 allows a disabled passenger to move into the seat 124 at a location remote from the platform 28, and then be easily moved to the platform for loading into the boat 26. By having the dolly 102 remain on the platform, less space is required for the seat 124 in the boat 126.

The ride attraction 20 with the seat mover 38 may, of course, be used on various theme or amusement park rides, for example, roller coasters, water flume rides, carousel rides, round rides, motion base vehicular rides, etc. The seat mover allows wheelchair bound persons to board, ride, and exit a ride attraction without using their personal wheelchairs.

Thus, a novel ride attraction has been shown and described. Various modification may be made without departing from the spirit and scope of the invention. The invention, therefore, should not be restricted, except by the following claims.

We claim:

1. A ride attraction comprising:

a closed loop predefined amusement ride vehicle path;

a vehicle movable on or in the path;

a seat mover in the vehicle for moving a seat between a position in the vehicle and a loading/unloading platform, the seat mover including a jack post, an actuator associated with the jack post, a swing arm pivotably attached to the actuator, and an extension arm pivotably attached to the swing arm, the extension arm having a housing including a T-leg.

2. The ride attraction of claim 1 further comprising a secondary seat lock on the T-leg.

3. An amusement park attraction, comprising:

a vehicle that moves along a path;

a lift seat attachable to the vehicle;

a lift actuator attached to the vehicle and to the seat for lifting and lowering the seat;

a floor in the vehicle;

a sub-floor adjacent to the floor; and a sub-actuator urging the sub-floor into a first position wherein the sub-floor is generally flush with the floor.

4. The attraction of claim 3 wherein the sub-actuator comprises a spring.

5. The attraction of claim 3 further comprising a vehicle seat in the vehicle and a sub-seat linked to the sub-floor, with the sub-seat movable under force of the lift seat, from a first sub-seat position wherein the sub-seat is generally flush with the vehicle seat, to a second sub-seat position wherein the sub-seat is below the vehicle seat.

6. A ride attraction comprising:

a ride vehicle;

a jack post on the vehicle;

a swing arm attached to the jack post;

a seat attached to the swing arm;

an actuator for raising and lowering the seat along the jack post; and a fixed floor and a movable sub-floor in the vehicle, with the sub-floor movable from a first position where the sub-floor is coplanar with the floor to a second position below the floor.

7. The ride attraction of claim 6 further comprising a dolly attachable onto the seat.

8. The ride attraction of claim 6, further comprising a swing arm lock for locking the swing arm into position.

9. The ride attraction of claim 6 wherein the jack post is inclined at an angle towards the rear of the vehicle.

10. The ride attraction of claim 6 further comprising a lock bar on the seat and a lock bar retainer on the extension arm.

11. The ride attraction of claim 6 wherein the actuator is electric, hydraulic or pneumatic.

12. The ride attraction of claim 11 wherein the actuator is powered by an off board source connecting to the actuator by a hose or cable.

13. The ride attraction of claim 6 further comprising a shoulder belt and a lap belt on the seat.

14. The ride attraction of claim 13 further comprising a slider attached to the shoulder belts and slidable over the lap belt.

15. The ride attraction of claim 6 further comprising a seat lock on one of the vehicle and the seat, for locking the seat into the vehicle.

16. The ride attraction of claim 15 further comprising a visual seat lock indicator linked to the seat lock.

17. The vehicle of claim 6 further comprising an extension arm pivotably attached to the swing arm between the swing arm and the seat.

18. The ride attraction of claim 6 further comprising a sub-seat attached to and moving with the sub-floor.

19. The ride attraction of claim 6 further comprising biasing means for urging the sub-floor into the first position.

20. The ride attraction of claim 19 wherein the biasing means comprises a spring pushing the sub-floor up with a force greater then the weight of a passenger.

21. The ride attraction of claim 6 further comprising a gunnel shield on the seat.

22. The ride attraction of claim 6 further comprising a footrest on the seat extending below the floor and positioned over the sub-floor, when the sub-floor is in the second position.

* * * * *